Sept. 10, 1957 J. P. LIVADARY 2,806,092

INTRALOOP MULTICIRUIT COUPLING

Filed Aug. 30, 1951 2 Sheets-Sheet 1

INVENTOR
JOHN P. LIVADARY
BY Lyon & Lyon
ATTORNEYS

INTRALOOP MULTICIRUIT COUPLING

Filed Aug. 30, 1951 2 Sheets-Sheet 2

INVENTOR
JOHN P. LIVADARY
BY Lyon & Lyon
ATTORNEYS 2,806,092
Patented Sept. 10, 1957

2,806,092

INTRALOOP MULTICIRCUIT COUPLING

John Paul Livadary, Los Angeles, Calif.

Application August 30, 1951, Serial No. 244,429
10 Claims. (Cl. 179—100.1)

The present invention relates broadly to the use of coupling in the elimination of cross-talk, and relates particularly to sound reproducing systems in which a plurality of magnetic or electrostatic pickup units are likely, due to their spacing, to introduce cross-talk into the system.

In certain sound systems, a plurality, such as three sound tracks are recorded on a film. For example, dialogue may be recorded on one of the tracks, associated music on a second track, and sound effects on a third track. Three pickup heads are associated respectively with such sound tracks and are used for selective reproduction purposes. Because of the physical spacing, the sound recorded on one of the channels may produce cross-talk effects in the reproducer associated with an adjacent sound track. This cross-talk may be the result of the close spacing of the different heads, leakage over the magnetic media, by transformer action, and the like.

It is therefore an important object of the present invention to provide means whereby such undesirable cross-talk effects may be eliminated.

A specific object of the present invention is to provide an improved means of this type which is characterized by its simplicity and which does not necessitate changing the physical structure or physical relationship of elements in reproducing systems of this character.

Another specific object of the present invention is to provide an improved means of this character in which undesirable cross-talk effects may be eliminated without the necessity of staggering adjacent heads, i. e., displacing one of the heads from an adjacent head along the direction of the sound tracks, thereby avoiding certain practical difficulties which would be present if the heads were staggered.

Another specific object of the present invention is to provide means of this character in which sound energy is fed from one channel to an associated channel and vice versa, with proper amplitude and proper phase to cancel out cross-talk voltages.

Although the means described hereinafter is shown incorporated in a specific type of sound reproducing system, using film with three adjacent sound tracks thereon, it is understood that the present invention in its broader aspects is not limited to its use with such systems, but may be used in other systems wherein voltages in controlled amounts are transferred between electromechanical transducers for elimination of cross-talk for related effects.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
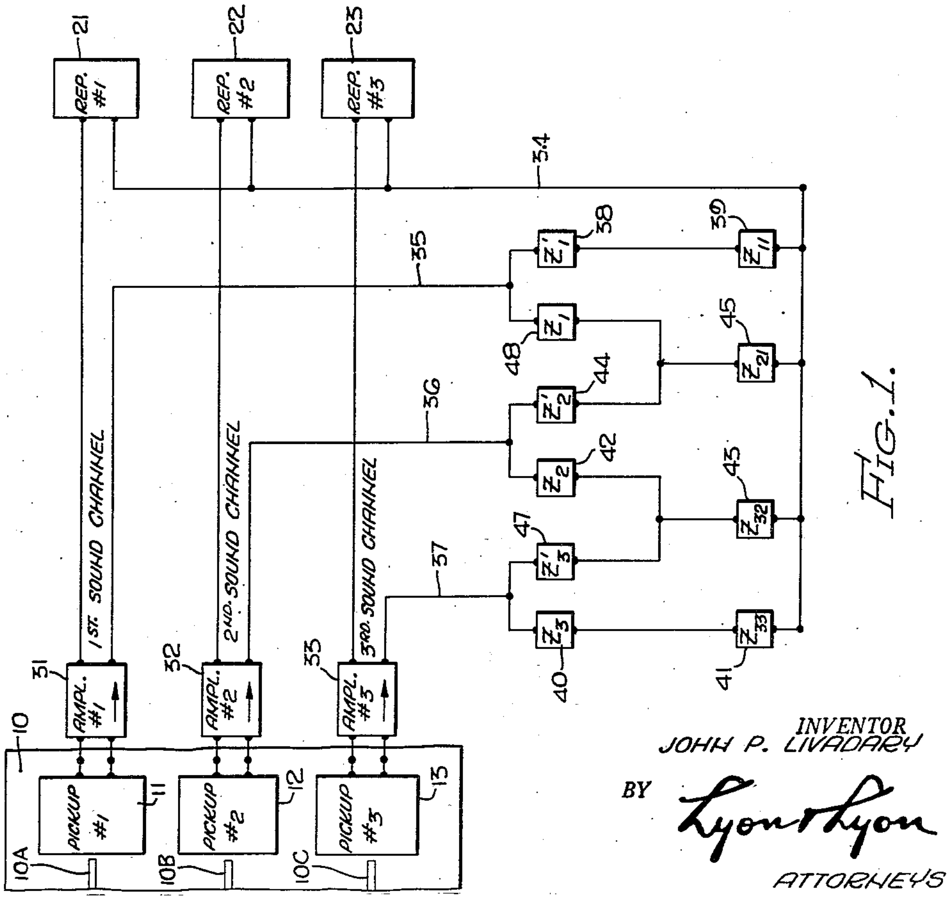
Figure 1 shows in generalized form improved means embodying the present invention in apparatus for reproducing simultaneously sound recorded on three adjacent channels on a film strip.

In Figure 1 there is represented, in schematic form, a film 10 upon which is magnetically recorded the three sound tracks 10A, 10B and 10C. For example, in motion picture work, the sound track 10A may contain the dialogue of an accompanying picture, the sound track 10B may contain the accompanying music, and the sound track 10C may contain the associated sound effects. It is desirable, for purposes of good sound presentation, to be able to pick up each of these recordings separately and to mix them as may be deemed desirable. For that purpose, there are provided three separate and independent transducers 11, 12 and 13. These transducers or pickups are aligned laterally of the recording tape 10, and since the strip 10 is of relatively small width, and since of course the pickup units occupy a certain space, the pickup units are really spaced quite close to one another and hence there may be interaction between adjacent heads to produce undesirable cross-talk effects.

It is desirable, and the present invention provides means whereby sound voltages appearing on the sound reproducing or rerecording unit 21 be truly representative of the sound recorded on the channel 10A; and likewise the sound reproduced or rerecorded by the unit 22 be truly representative of the sound recorded on channel 10B; and likewise that the sound reproduced or rerecorded by unit 23 be truly representative of the sound recorded on channel 10C, all without cross-talk induced from one pickup to the other. It is understood that various amplifier stages may be incorporated in the system, and such amplifiers are represented at 31, 32 and 33 for purposes of amplifying the voltages developed in the pickup units 11, 12 and 13, respectively, before application to the units 21, 22, 23.

It is recognized that certain cross-talk effects do exist because of the close spacing of the pickup units, the magnetic leakage laterally of the tape 10, and for that reason a coupling circuit serves to couple adjacent sound channels. This coupling circuit preferably takes the form shown generalized in Figure 1, since it is relatively easy to adjust for purposes of obtaining proper voltage amplitudes and phase relationships between the three different sound channels.

In Figure 1 it is observed that the lead 34 is common to each of the reproducing or rerecording units 21, 22 and 23, and that the leads 35, 36 and 37 are connected directly to the first, second and third sound channels. The serially connected impedances 38, 39 are thus common to the first sound channel; the serially connected impedances 40 and 41 are common to the third sound channel; but the second sound channel contains two parallel circuits comprising, on the one hand, the serially connected impedances 42 and 43 and, on the other hand, the impedances 44 and 45. Of importance is the fact that the impedance 47 couples the second channel to the third channel, and likewise the impedance 48 couples the second channel to the first channel. By this expedient, it is observed that some of the currents flowing in the first sound channel flows also in the second and third sound channels; likewise, some of the current flowing in the second sound channel flows in the first and third channels, and some of the current in the third channel flows in the first and second sound channels. This symmetrical interdependency between the three channels is perhaps made more clear with reference to Figure 2, where the impedances are actually resistances having the same reference numerals, and the common lead 34 is grounded.

Figures 3, 4:
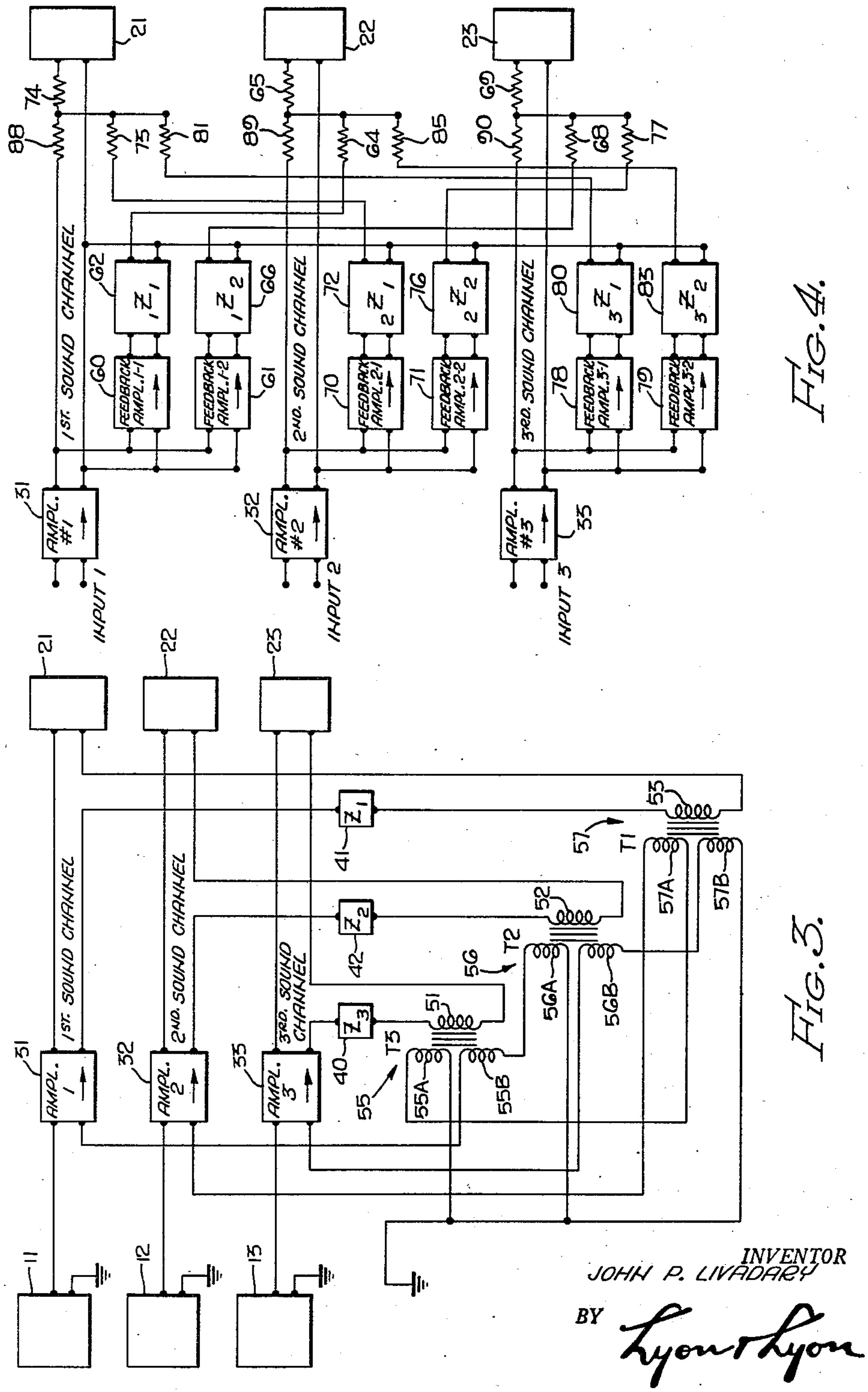
Figure 3 shows another form of coupling, i. e., transformer coupling which may be utilized to achieve advantages of the present invention.
Figure 4 shows still other apparatus embodying the present invention which may be used for this purpose.

Figure 3 shows a different form of the present invention in which the symmetrical coupling between the three sound channels may be effected by transformer coupling. It is observed in Figure 3 that the connection between amplifier 31 and unit 21, in the first instance, the connection between the amplifier 32 and unit 22, in the second instance, and the amplifier 33 and unit 23 in the third instance, each contain the secondary windings 51, 52 and 53, respectively, of corresponding transformers 55, 56 and 57. The two primary windings 55A and 55B are energized respectively in accordance with voltages developed in the pickup units 11 and 12; likewise the primary windings 56A and 56B are energized respectively with voltages developed in the pickup units 11 and 13; and likewise the primary windings 57A and 57B are energized respectively with voltages developed in the pickup units 12 and 13. Again, by this expedient, a balanced system is provided in which coupling between the three channels may be varied both as to amplitude and as to phase by adjustment of the impedances 40, 41 and 42.

In Figure 4 still a further means is provided for obtaining intercoupling between associated sound channels for eliminating or balancing out cross-talk voltages, or otherwise reducing their effect on the units 21, 22 and 23. In this instance the voltage appearing at the output of amplifier 31 is amplified in the amplifiers 60 and 61, the output of the amplifier 60 being applied through impedance 62, through resistances 64 and 65, to the unit 22, and the output of amplifier 61 being applied through the impedance 66 and resistances 68 and 69 to the unit 23. Similarly, the output of the amplifier stage 32 is amplified in the amplifiers 70 and 71, the output of the amplifier 70 being applied through impedance 72 and resistances 73 and 74 to the unit 21, and the output of amplifier 71 being applied through impedance 76 and resistance 77 and common resistance 69 to the unit 23. In similar manner, the output of amplifier stage 33 is amplified in the amplifiers 78 and 79, the output of amplifier 78 being applied through impedance 80 and resistance 81 and common resistance 74 to the unit 21, and the output of amplifier 79 being applied through impedance 83 and resistance 85 and common resistance 65 to the unit 22. Resistance 88 interconnects the amplifier 31 to the unit 21; resistance 89 connects the amplifier 32 to the unit 22; and the resistance 90 connects the amplifier 33 to the unit 23.

It will thus be observed that different means have been provided for accomplishing these aforementioned desirable results. Specifically, in the arrangement shown in Figures 1 and 2, the coupling between three sound channels is effected by means of passive networks. In Figure 3 this is accomplished by transformer coupling and in Figure 4 an amplifier in addition to a passive network is used. It is noted further that in Figures 1 and 4 the coupling is accomplished at the output of the three circuits, whereas in Figure 3 the comparable coupling is between the output of one circuit and the input of he associated circuits.

In general, in Figure 1, which represents the simplest arrangement, impedances 40, 47 and 42, 44 are used to divide the output current of each amplifier into two components. The adjustment is such that the ratio of currents flowing in impedances 47 and 42 is equal to the desired coupling coefficient between the second and third channels, the coupling impedance in such case being impedance 43. Similarly, impedances 44 and 48 carry currents proportional to the desired coupling coefficient, the actual coupling impedance in such case being impedance 45. Impedances 41 and 39 are used to balance out the end circuits.

The coupling between non-adjacent channels, such as channel 3 and channel 1, is determined by the current which flows through impedance 48 and a fraction of the current which flows through impedance 47. This fraction is approximately equal to the coupling impedance which, in this case, is impedance 45, but effectively the coupling coefficient is equal to $K_{31}$ which is equal to $$\frac{Z_{21}Z_{32}}{Z_2+Z'_2}$$

Figure 2:
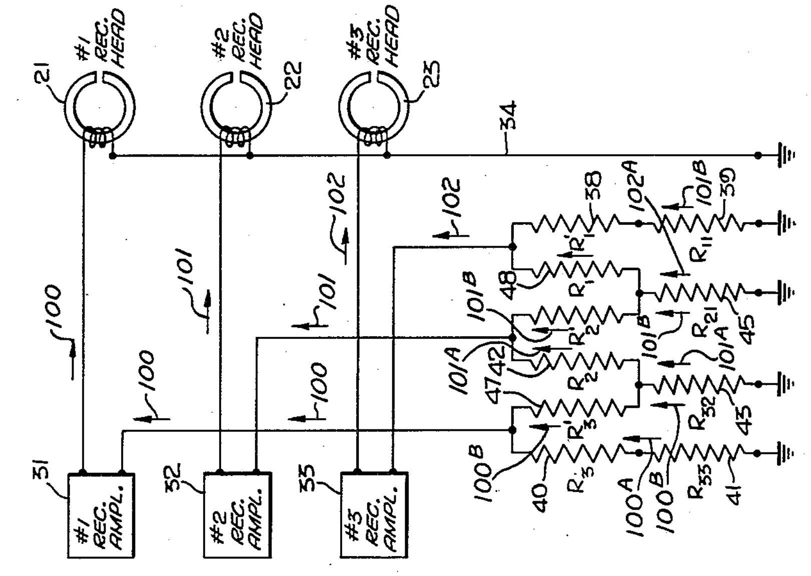
Figure 2 shows a specific form of the present invention using resistance coupling between three recording heads and three associated recording amplifiers for the purpose of eliminating cross-talk effects.

In general, the impedances represented as such in Figure 1 may actually comprise resistances, condensers, inductances, transformers, or a combination of the same, which have either positive values, as in the case of passive networks, or negative values as in the case of vacuum tube circuits. Such arrangement permits correction of frequency discrimination and phase shift. If no frequency correction is required, straight resistances may be used as shown in Figure 2. In the arrangement shown in Figure 2, where the desired coupling is resistive, $R_{12}$ is equal to $R_{21}$, is equal to $R_{32}$, is equal to $R_{23}$, and $R_{13}$ is equal to $R_{31}$.

One of the simplest applications of this method of coupling heterogeneous circuits for the purpose of minimizing cross-talk interference between them is in the above mentioned multi-track magnetic recording system, where several magnetic sound tracks are recorded adjacent to each other on magnetic film. In such case, low frequency speech currents cross-talk from one sound track to the adjacent track via the magnetic media, i. e., the film, and high frequency speech currents cross-talk through the magnetic recording heads, which are stacked up parallel to each other and are lined up with the recording air gap slits along a straight line perpendicular to the motion of the film. In such case, the arrangement is symmetrical if the distance between adjacent sound tracks is the same. To remedy cross-talk in this type of arrangement, a simple resistive passive network is preferred whereby cross talk may be reduced by 20 to 30 decibels without great difficulty.

It is obvious that the means described above may be used where signals are predominantly of either a single frequency or lie in a frequency band. Furthermore, this frequency band could either be in the audio frequency spectrum or in a higher frequency spectrum.

While it is understood that feedback, both negative and positive in character, has been used heretofore in various types of circuits, either audio or radio frequency circuits, for purposes of increasing gain or for frequency selective purposes, or for purposes of increasing fidelity, the feedback in such instance is between different elements of a single channel. The present invention distinguishes from these prior arrangements in that the coupling, instead of being between parts of the same channel, is between unrelated independent circuits or channels.

While the present invention is described specifically above in relationship to sound reproduction, it is obvious that the same, with the teachings herein, may be used in the process of sound recording for the same purpose, namely, for substantially reducing or eliminating the effects of cross-talk. As a matter of fact, the coupling purposely introduced while recording in a sound-recording-sound-reproducing system may be varied to obtain substantially the same net result, using any one of the following three arrangements.

First, presupposing that both the sound recording and reproducing apparatus introduces undesirable cross-talk effects, all of the corrective coupling necessary to make corrections in the composite system may be introduced while recording, and none while reproducing. Second, presupposing the same conditions as above, all of the corrective coupling may be introduced while reproducing, and none while recording. Third, presupposing the same conditions as before, some of the coupling may be introduced while recording and some of the feedback may be introduced while reproducing, to obtain a reproduction substantially free from cross-talk effects.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a system of the character described, a sound film having at least two adjacent recordings thereon, a separate magnetic pickup head for each of said recordings mounted in spaced relationship with each other and in cooperative relationship with a corresponding one of said recordings, one of said pickup heads being magnetically coupled to the other one of said pickup heads and subjected to cross-talk effects in accordance with the recording associated with the other pickup head, a utilization device connected respectively to each of said pickup heads, and a single impedance element traversed by current flowing in each of said utilization devices, such that energy is transferred from one pickup head to the utilization device connected to the other pickup head with such intensity and phase to counteract such cross-talk effects.

2. In a system of the character described for reproducing a plurality of separate recordings on a single strip, a magnetic pickup head for each one of said recordings, each pickup head being magnetically coupled to the other pickup head and thereby being subjected to cross-talk effects in accordance with the recording associated with the other pickup head, a utilization device connected to a corresponding one of said pickup heads, means coupling associated pickup heads to associated utilization devices, said coupling means comprising a common impedance element through which currents flow in response to either one of said plurality of recordings, such that energy is fed from one pickup head to the utilization device connected to the other pickup head with such intensity and phase to counteract said cross-talk effects.

3. In a system of the character described for reproducing a plurality of recordings on a single strip, a separate magnetic pickup head for each of said recordings, each pickup head being magnetically coupled to the other pickup head and thereby being subjected to cross-talk effects in accordance with the recording associated with the other pickup head, a corresponding utilization device for a corresponding one of said pickup heads, means coupling a corresponding one of said pickup heads to a corresponding one of said utilization devices, said coupling means comprising a common impedance through which currents produced in either of said pickup heads affects current produced by the other one of said heads, such that energy is transferred from one pickup head to the utilization device connected to the other pickup head with such intensity and phase to counteract said cross-talk effects.

4. In apparatus of the character described for reproducing a plurality of recordings on a single strip, a magnetic pickup head for each of said recordings, each pickup head being magnetically coupled to the other pickup head and thereby being subjected to cross-talk effects in accordance with the recording associated with the other pickup head, a utilization device for each of said pickup heads, means coupling a corresponding one of said pickup heads to a corresponding utilization device, said coupling means comprising a first resistance serially connected with a first utilization device, a second resistance serially connected with a second utilization device, and a third resistance serially connected with said first and second resistances to transfer energy from one of said pickup heads to the utilization device connected to the other pickup head with such intensity and phase to counteract said cross-talk effects.

5. In apparatus of the character described for reproducing three separate recordings on a single strip, a magnetic pickup head for each one of said recordings, each pickup head being magnetically coupled to the other pickup head and thereby being subjected to cross-talk effects in accordance with the recording associated with the other pickup head, a utilization device for each one of said pickup heads, means coupling each of said pickup heads to a corresponding one of said utilization devices, said coupling means comprising: a first impedance serially connected between a first pickup head and a first utilization device, a second impedance serially connected between a second pickup head and a second utilization device, a third impedance connected in shunt with said first impedance, a fourth impedance serially connected with said third impedance and connected in shunt with said first impedance, said fourth impedance and a fifth impedance being serially connected with said second utilization device, a sixth and seventh impedance serially connected in a series circuit, said series circuit being connected in shunt with said fourth and fifth impedance, an eighth impedance connected in shunt with said second impedance, said sixth impedance being serially connected with said eighth impedance, said coupling means being thereby effective to transfer energy from one of said pickup heads to the other pickup head to counteract the cross-talk effects.

6. In apparatus of the character described for reproducing a plurality of recordings on a single film, a separate pickup head for each recording, said heads being mounted in spaced relationship with each other and in cooperative relationship with a corresponding one of said recordings, said pickup heads being subjected to cross-talk effects in accordance with the recording associated with the other pickup head, a utilization device corresponding to each of said pickup heads, a first transformer having a primary winding and a secondary winding, a second transformer having a primary winding and a secondary winding, means including the secondary winding of said first transformer for coupling the first pickup head to its corresponding utilization device, means including the secondary winding of said second transformer for coupling a second pickup head to its corresponding utilization device, means coupling the primary winding of said first transformer to said second pickup head, and means coupling the primary winding of said second transformer to said first pickup head, to thereby transfer energy from one pickup head to the utilization device associated with the other pickup head to counteract the cross-talk introduced by the recording associated with said one pickup head into said other pickup head.

7. In a system of the character described, a first transducer associated with a first channel of a recording media, a second transducer associated with a second channel of said recording media, said second transducer, however, being related to said first channel that cross-talk between said first channel and said second transducer occurs, first energy converting means, a first sound channel including said first transducer coupled to said first energy converting means, second energy converting means, a second sound channel including said second transducer coupled to said second energy converting means, and energy transferring means between said first transducer and said second sound channel to transfer energy therebetween of such intensity and phase that the effect of said cross-talk is substantially reduced.

8. The arrangements set forth in claim 7 in which said first and said second transducers each constitutes a pickup head.

9. The arrangements set forth in claim 7 in which each of said transducers constitutes a recording head.

10. In a system of the character described, a first transducer associated with a first channel of a recording media, a second transducer associated with a second channel of a recording media, said second transducer, however, being related to said first channel that cross-talk between said first channel and said second transducer occurs, said second transducer being coupled in an energy transferring channel, and means transferring energy between said first transducer and said channel of such intensity and phase that the effect of said cross-talk is substantially minimized.

References Cited in the file of this patent

UNITED STATES PATENTS

| | | |
|---|---|---|
| Re. 23,311 | Camras | Dec. 26, 1950 |
| 1,928,735 | Nyquist | Oct. 3, 1933 |

| | | |
|---|---|---|
| 2,008,061 | Coolidge et al. | July 16, 1935 |
| 2,026,308 | Ganz | Dec. 31, 1935 |
| 2,213,246 | Heller | Sept. 3, 1940 |
| 2,249,606 | Friebus | July 15, 1941 |
| 2,343,471 | Nixon | Mar. 7, 1944 |
| 2,403,985 | Koenig | July 16, 1946 |